(12) United States Patent
Sun et al.

(10) Patent No.: US 11,166,138 B2
(45) Date of Patent: Nov. 2, 2021

(54) LOW-POWER WIRELESS MESH NETWORK

(71) Applicant: Realtek Semiconductor Corp., HsinChu (TW)

(72) Inventors: Zaiqiang Sun, Shanghai (CN); Shimeng Zou, Suzhou (CN)

(73) Assignee: Realtek Semiconductor Corp., HsinChu (TW)

( * ) Notice: Subject to any disclaimer, the term of this patent is extended or adjusted under 35 U.S.C. 154(b) by 64 days.

(21) Appl. No.: 16/777,891

(22) Filed: Jan. 31, 2020

(65) Prior Publication Data

US 2020/0382931 A1 Dec. 3, 2020

(30) Foreign Application Priority Data

May 28, 2019 (CN) .......................... 201910451638.X

(51) Int. Cl.
*H04W 4/00* (2018.01)
*H04W 4/80* (2018.01)
*H04W 56/00* (2009.01)
*H04L 1/16* (2006.01)
*H04W 84/18* (2009.01)

(52) U.S. Cl.
CPC ............. *H04W 4/80* (2018.02); *H04L 1/1642* (2013.01); *H04W 56/001* (2013.01); *H04W 84/18* (2013.01)

(58) Field of Classification Search
CPC ..... H04W 4/80; H04W 56/001; H04W 84/18; H04L 1/1642
USPC ................................. 370/329, 311, 310, 328
See application file for complete search history.

(56) References Cited

U.S. PATENT DOCUMENTS

| | | | | |
|---|---|---|---|---|
| 10,165,622 | B2* | 12/2018 | Singh | H04W 52/0212 |
| 10,638,427 | B2* | 4/2020 | Choi | H04L 5/0055 |
| 10,716,048 | B2* | 7/2020 | Arvidson | H04W 84/20 |
| 10,742,837 | B1* | 8/2020 | Sankarapandian | H04N 1/32545 |
| 10,848,945 | B2* | 11/2020 | Choi | H04L 29/08 |
| 10,897,763 | B2* | 1/2021 | Flammer, III | H04W 72/0453 |
| 2006/0056363 | A1* | 3/2006 | Ratiu | H04W 40/22 370/338 |
| 2011/0111700 | A1* | 5/2011 | Hackett | A01G 25/16 455/41.2 |
| 2017/0034688 | A1* | 2/2017 | Kim | G01S 5/26 |
| 2018/0234920 | A1* | 8/2018 | Bae | H04W 52/0225 |
| 2018/0279376 | A1* | 9/2018 | Dinan | H04W 74/0833 |
| 2019/0053179 | A1* | 2/2019 | Taylor | H04W 56/0015 |
| 2019/0230578 | A1* | 7/2019 | Karaki | H04W 74/0816 |
| 2019/0349878 | A1* | 11/2019 | Ashraf | H04L 5/0053 |
| 2020/0092895 | A1* | 3/2020 | Wang | H04W 72/1278 |
| 2020/0205106 | A1* | 6/2020 | Shreevastav | H04W 56/0015 |
| 2020/0367163 | A1* | 11/2020 | Qu | H04W 52/0245 |

FOREIGN PATENT DOCUMENTS

| CN | 107113721 A | 8/2017 |
|---|---|---|
| CN | 107371217 A | 11/2017 |

* cited by examiner

*Primary Examiner* — Marceau Milord
(74) *Attorney, Agent, or Firm* — Winston Hsu

(57) ABSTRACT

A wireless mesh network includes multiple low-power nodes. When functioning as a data receiving node or a data relay node, each low-power node is used to monitor data transmission at intervals. Each node performs time synchronization based on an SFN and an H-SFN of a base NB-IoT cell. At least one of the multiple low-power nodes is located in the base NB-IoT cell.

9 Claims, 3 Drawing Sheets

LOW-POWER WIRELESS MESH NETWORK

CROSS REFERENCE TO RELATED APPLICATION

This application claims priority of China Application No. 201910451638.X filed on 2019 May 28.

BACKGROUND OF THE INVENTION

1. Field of the Invention

The present invention is related to a wireless mesh network, and more particularly, to a low-power wireless mesh network which performs time synchronization based on an SFN and an H-SFN of a base NB-IoT cell.

2. Description of the Prior Art

With rapid development in network technologies, various wireless networks have been continuously improved to provide better wireless communications. Among them, wireless mesh network (WMN) is one of the emerging technologies aimed at seamlessly connecting the world. A wireless mesh network may be deployed in a region without or not worthy of setting up any wired network in order to provide easy, effective and wireless connection in this region using inexpensive and existing technologies. Characterized in self-organized and self-organized abilities, a wireless mesh network can be easily deployed and maintained.

FIG. 1 is a diagram illustrating a prior art mesh network 100. The mesh network 100 includes a plurality of mesh nodes NM, each of which may serve as a data transmitting node, a data receiving node, or a data relay node. When serving as a data receiving node or a data relay node, each mesh nodes NM is configured to continuously monitor data communication in the mesh network 100 so as to ensure that data can be received and redirected on a real-time basis. Therefore, the prior art mesh network 100 consumes large power and requires large-capacity batteries when used in IoT products, which further increases manufacturing costs.

Each of the plurality of mesh nodes in a mesh network may activate its corresponding sensor so that data measured by multiple sensors at different time may be analyzed. If the plurality of mesh nodes in the mesh network can simultaneously activate respective sensors, the duty cycle of receiving and transmitting data may be reduced, thereby lowering system power consumption. In the prior art mesh network 100, each mesh node can operate based on the timing signal generated by its internal clock. However, without synchronizing all the mesh nodes in the mesh network, the above-mentioned simultaneous activation cannot be achieved for reducing power consumption.

SUMMARY OF THE INVENTION

The present invention provides a wireless mesh network which includes a plurality of low-power nodes each supporting both a mesh technology and an NB-IoT technology. The plurality of low-power nodes are configured to monitor data transmission at intervals when serving as a data receiving node or a data relay node, and perform time synchronization based on an SFN and an H-SFN of a base NB-IoT cell, wherein at least one of the plurality of low-power nodes is located in the base NB-IoT cell.

The present invention also provides a method of transmitting and receiving signals in a wireless mesh network. A first low-power node and a second low-power node of the wireless mesh network perform a time synchronization base on an SFN and an H-SFN of a base NB-IoT cell, wherein the first low-power node and the second low-power node support both a mesh technology and an NB-IoT technology. The first low-power node transmits a signal, and the second low-power node receives the signal transmitted by the first low-power node during a first receiving slot of a first receiving period and stopping to receive the signal during a first idle slot of the first receiving period, wherein a length of the first idle slot is larger than 0.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
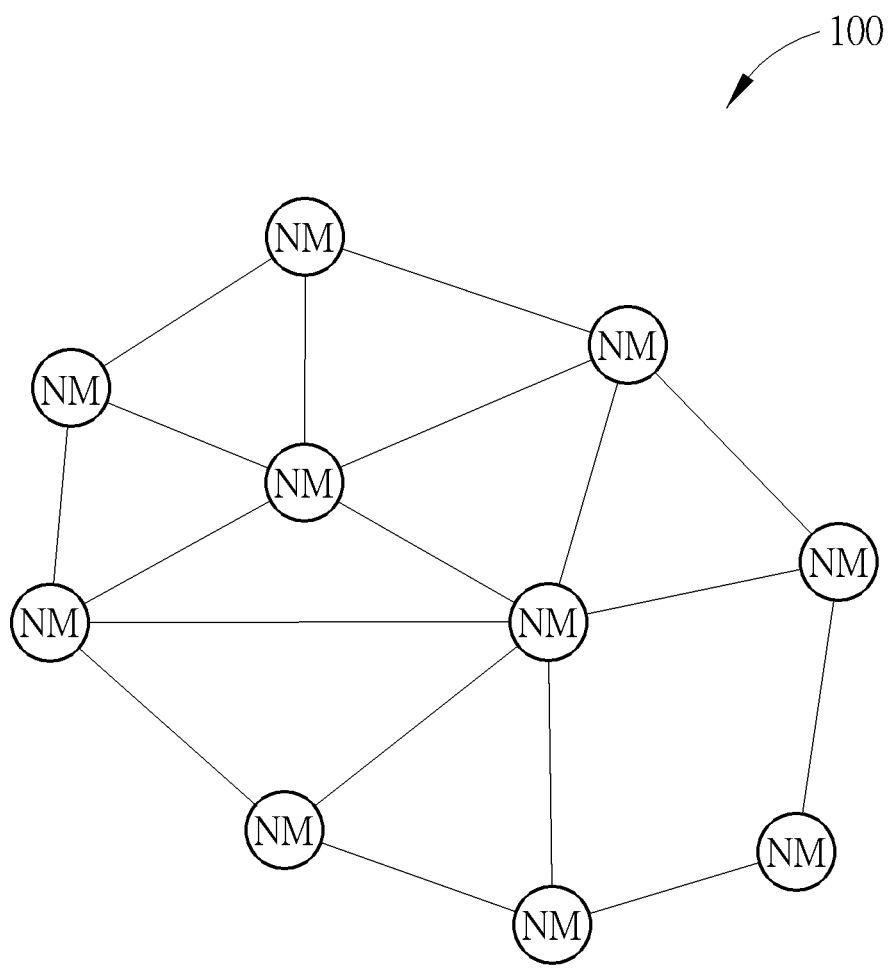
FIG. 1 is a diagram illustrating a prior art mesh network.
Figure 2:
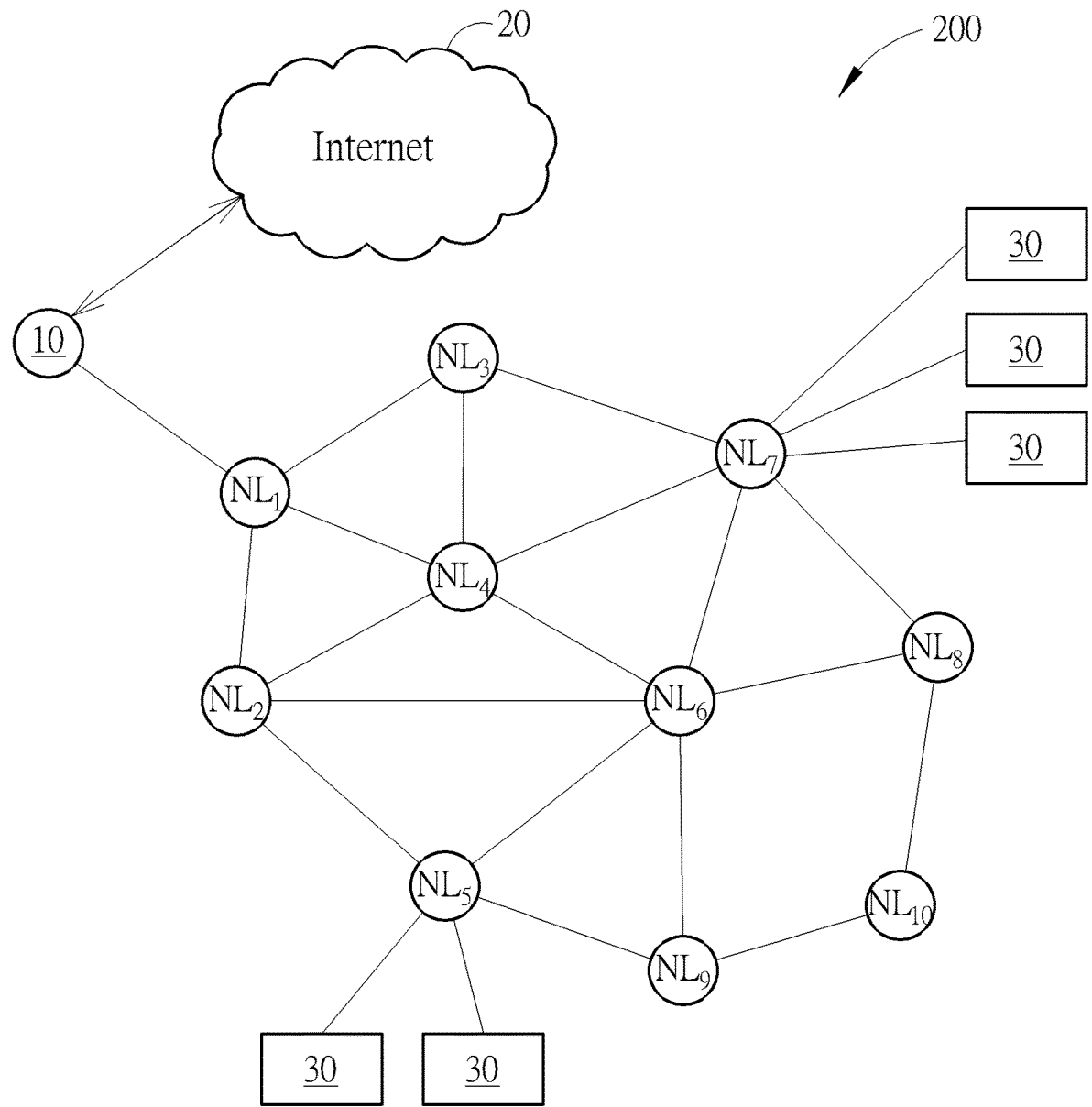
FIG. 2 is a diagram illustrating a wireless mesh network according to an embodiment of the present invention.

FIG. 2 is a diagram illustrating a wireless mesh network 200 according to an embodiment of the present invention. The mesh network 200 includes a mesh portal 10 and a plurality of low-power nodes $NL_1 \sim NL_M$, wherein M is an integer larger than 1. For illustrative purpose, FIG. 2 depicts the embodiment when M=10. However, the amount of the low-power nodes in the wireless mesh network 200 does not limit the scope of the present invention.

The mesh portal 10 is a gateway between an Internet 20 and the mesh network 200, and configured to provide data routing from the wireless mesh network 200 to the Internet 20 or from the Internet 20 to the wireless mesh network 200. The plurality of low-power nodes $NL_1 \sim NL_M$ may directly provide wireless Internet access to one or multiple mobile stations 30 using wireless access link.

In the wireless mesh network 200 of the present invention, the low-power nodes $NL_1 \sim NL_M$ support both the mesh technology and the Narrow Band-Internet of Things (NB-IoT) technology. Each of the low-power nodes $NL_1 \sim NL_M$ may serve as a data transmitting node, a data receiving node, or a data relay node. When a first low-power node $NL_1$ serving as a data transmitting node is located within the coverage range of a second low-power node $NL_2$ serving as a data receiving node, a wireless mesh link may be established between these two low-power nodes for data communication. These low-power nodes $NL_1 \sim NL_M$ and the mesh portal 10 form a mesh distribution system in which the first low-power node $NL_1$ serving as a data transmitting node may transmit data to the second low-power node $NL_2$ serving as a data relay node, and the second low-power node $NL_2$ serving as a data transmitting node may transmit data to the third low-power node $NL_3$ serving as a data receiving node.

NB-IoT is a standards-based low power wide area technology developed to enable a wide range of new IoT devices and can be deployed in 3 different modes: in-band, guard-band or stand-alone. NB-IoT systems can co-exist with existing 2G, 3G, and 4G mobile networks and thus benefit from all the security and privacy features of these mobile networks. In an NB-IoT system, the base station is configured to transmit system information to all mobile stations in its cell via broadcast control channel (BCCH). Each mobile station may acquire information including downlink system bandwidth, physical hybrid ARQ indicator channel (PHICH), system frame number (SFN), and cell-specific antenna port. The time unit for synchronizing each mobile station with the base station is SFN and hyper system frame number (H-SFN). The length of an SFN is 10 ms and the value of the SFN increases by 1 every 10 ms from 1 to 1023. When the value of the SFN reaches 1023, it restarts from 0, which means each SFN cycle is equal to 10.24 seconds. An H-SFN includes a range of 1-1023 SFNs, which means the maximum period of the H-SFN includes 2014 SFN cycles corresponding to 2.9127 hours. The SFNs and H-SFNs of different NB-IoT cells are not necessarily aligned, but the SFNs and H-SFNs of the same NB-IoT cell are stable. Therefore, by acquiring the SFN and H-SFN variations between different NB-IoT cells, all nodes in these different NB-IoT cells may be synchronized.

Figure 3:
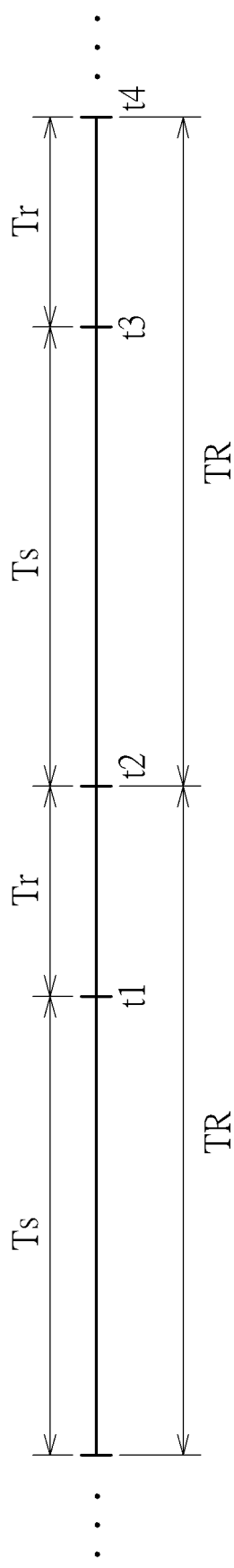
FIG. 3 is a diagram illustrating the operation of the low-power nodes in a wireless mesh network when serving as a data receiving node or a data relay node according to an embodiment of the present invention.
Figure 4:
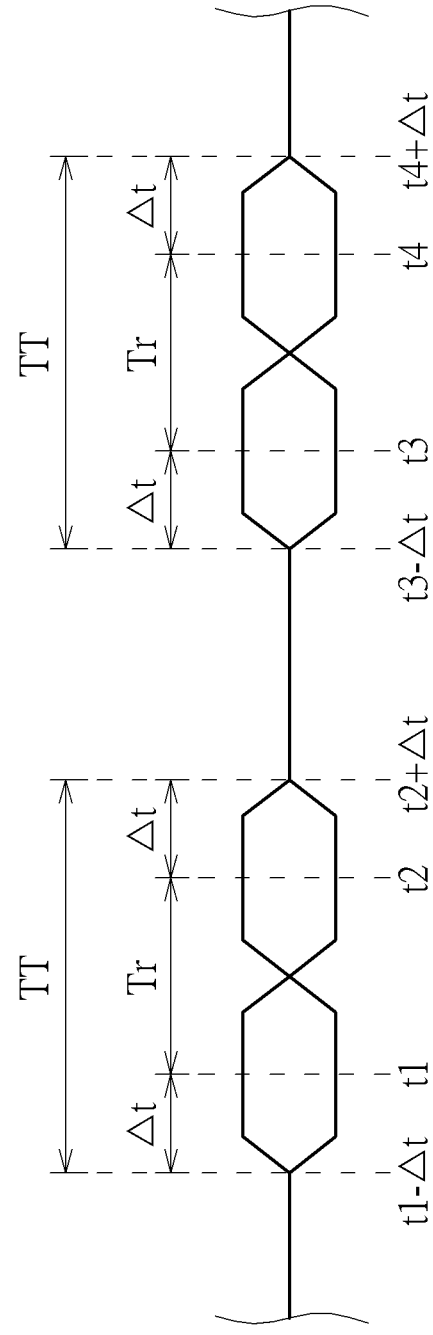
FIG. 4 is a diagram illustrating the operation of the low-power nodes in a wireless mesh network when serving as a data transmitting node according to an embodiment of the present invention.

FIG. 3 is a diagram illustrating the operation of the low-power nodes $NL_1 \sim NL_M$ in the wireless mesh network 200 when serving as a data receiving node or a data relay node according to an embodiment of the present invention. FIG. 4 is a diagram illustrating the operation of the low-power nodes $NL_1$-$NL_M$ in the wireless mesh network 200 when serving as a data transmitting node according to an embodiment of the present invention.

As depicted in FIG. 3, when serving as a data receiving node or a data relay node, the low-power nodes $NL_1 \sim NL_M$ are configured to receive signals at intervals, wherein TR represents the length of a receiving period, Tr represents the length a receiving slot in the receiving period TR (0<Tr<TR), and Ts represents the length of an idle slot in the receiving period TR (Ts>0). Since the low-power nodes $NL_1 \sim NL_M$ are only required to operate during the receiving slot Tr in each receiving period TR, the power consumption when monitoring data communication at intervals may be reduced to Tr/TR of the power consumption of a prior art mesh network which continuously monitors data transmission. For illustrative purpose, FIG. 3 only depicts two receiving periods TR respectively including a receiving slot Tr between time points t1-t2 and a receiving slot Tr between time points t3-t4

As depicted in FIG. 4, when serving as a data transmitting node, the low-power nodes $NL_1 \sim NL_M$ are configured to transmit signals during each transmitting period TT. For illustrative purpose, FIG. 4 only depicts a transmitting period TT between time points (t1-Δt) and (t2+Δt) and a transmitting period TT between time points (t3-Δt) and (t4+Δt). The length of each transmitting period TT is equal to (Tr+2* Δt).

For nodes located within the same NB-IoT, time variation may exist between the NPBCH detected by each node depending on its distance to the base station. Since the normal coverage range of the base station is 0.5-3 km, it is assumed that the coverage range of the base station is 3 km for illustrative purpose. Using the speed of light for calculation and disregarding the variation in the receiving ability of each mobile station, the maximum discrepancy of the SFNs and H-SFNs detected by the mobile stations in a specific NB-IoT is about 10 ms. Therefore, the value of the time interval Δt may be set to 10 ms in an embodiment of the present invention. However, the value of the time interval Δt does not limit the scope of the present invention.

Since all low-power nodes in the wireless mesh network 200 of the present invention support the NB-IoT technology, the SFN and the H-SFN of a base NB-IoT cell may be used to synchronize all low-power nodes. In other words, each low-power node is informed of the length of an idle slot (Tr) in its receiving period TR, the start time of its receiving periods TR (time points t1 and t3), and the end time of its receiving periods TR (time points t2 and t4) when serving as a data receiving node or a data relay node. Therefore, when serving as a data transmitting node, each low-power node may start to transmit signals before the start time of its receiving slot (such as at time points t1-Δt or t3-Δt) during the transmitting period TT whose length is longer than the length of the receiving slot (such as equal to Tr+2*Δt), thereby ensuring that data can be received by other data receiving nodes or data relay nodes.

In conclusion, the present invention provides a wireless mesh network which includes a plurality of low-power nodes each supporting both the mesh technology and the NB-IoT technology. The plurality of low-power nodes may perform time synchronization based on the SFN and the H-SFN of a base NB-IoT cell. Also, the plurality of low-power nodes are configured to monitor data transmission at intervals when serving as a data receiving node or a data relay node, thereby reducing power consumption of the wireless mesh network.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless mesh network, comprising a plurality of low-power nodes each supporting both a mesh technology and a Narrow Band-Internet of Things (NB-IoT) technology, and configured to:
   monitor data transmission at intervals when serving as a data receiving node or a data relay node; and
   perform time synchronization based on a system frame number (SFN) and a hyper system frame number (H-SFN) of a base NB-IoT cell, wherein at least one of the plurality of low-power nodes is located in the base NB-IoT cell,
   wherein:
   a first low-power node among the plurality of low-power nodes is configured to transmit a signal;
   a second low-power node among the plurality of low-power nodes is configured to receive the signal transmitted by the first low-power node during a first receiving slot of a first receiving period and stop to receive the signal during a first idle slot of the first receiving period;
   the second low-power node is further configured to transmit the signal during a second transmitting period;
   a third low-power node among the plurality of low-power nodes is configured to receive the signal transmitted by the second low-power node during a second receiving slot of a second receiving period and stop to receive the signal during a second idle slot of the second receiving period;
   a length of the first idle slot is larger than 0;
   a length of the second idle slot is larger than 0; and a length of the second transmitting period is larger than or equal to a length of the second receiving slot.

2. The wireless mesh network of claim 1, wherein each low-power node is configured to receive signals during a receiving slot of a receiving period and stop receiving signals during an idle slot of the receiving period when serving as the data receiving node or the data relay node.

3. The wireless mesh network of claim 2, wherein each low-power node is configured to transmit signals during a transmitting period when serving as a data transmitting node, and a length of the transmitting period is larger than or equal to a length of the receiving slot.

4. The wireless mesh network of claim 3, wherein:
the receiving slot is between a first time point and a second time point;
the transmitting period is between a third time point and a fourth time point; and
the third time point is earlier than the first time point.

5. The wireless mesh network of claim 4, wherein the second time point is earlier than the fourth time point.

6. A method of transmitting and receiving signals in a wireless mesh network, comprising:
a first low-power node and a second low-power node of the wireless mesh network performing a time synchronization base on a system frame number (SFN) and a hyper system frame number (H-SFN) of a base Narrow Band-Internet of Things (NB-IoT) cell, wherein the first low-power node and the second low-power node support both a mesh technology and an NB-IoT technology;
the first low-power node transmitting a signal;
the second low-power node receiving the signal transmitted by the first low-power node during a first receiving slot of a first receiving period and stopping to receive the signal during a first idle slot of the first receiving period, wherein a length of the first idle slot is larger than 0;
a third low-power node and a fourth low-power node of the wireless mesh network performing the time synchronization base on the SFN and the H-SFN of the NB-IoT cell, wherein the third low-power node and the fourth low-power node support both the mesh technology and the NB-IoT technology;
the second low-power node transmitting the signal during a second transmitting period; and
the third low-power node receiving the signal transmitted by the second low-power node during a second receiving slot of a second receiving period and stopping to receive the signal during a second idle slot of the second receiving period, wherein a length of the second idle slot is larger than 0 and a length of the second transmitting period is larger than or equal to a length of the second receiving slot.

7. The method of claim 6, further comprising:
the first low-power node transmitting the signal during a first transmitting period, wherein a length of the first transmitting period is larger than or equal to a length of the first receiving slot.

8. The method of claim 7, wherein:
the first receiving slot is between a first time point and a second time point;
the first transmitting period is between a third time point and a fourth time point; and
the third time point is earlier than the first time point.

9. The method of claim 8, wherein the second time point is earlier than the fourth time point.

* * * * *